United States Patent [19]

Sypniewski

[11] Patent Number: 4,895,909

[45] Date of Patent: Jan. 23, 1990

[54] IMBIBER POLYMERS ALKYLATED AFTER POLYMERIZATION

[75] Inventor: George C. Sypniewski, Marinette, Wis.

[73] Assignee: The Dow Chemical Company, Midland, Mich.

[21] Appl. No.: 322,313

[22] Filed: Mar. 10, 1989

Related U.S. Application Data

[60] Division of Ser. No. 194,645, May 16, 1988, Pat. No. 4,835,222, which is a continuation of Ser. No. 16,438, Feb. 19, 1987, abandoned.

[51] Int. Cl.$^4$ .............................................. C08F 00/00
[52] U.S. Cl. ..................................... 525/309; 525/308
[58] Field of Search ................ 525/244, 245, 309, 308

[56] References Cited

U.S. PATENT DOCUMENTS 3,309,424  3/1967  Abe ..................................... 525/309

*Primary Examiner*—Christopher Henderson

[57] ABSTRACT

Effective organic fluid-insoluble organic fluid-swellable polymer particles are prepared from vinyl aromatic polymer particles. Alkyl halide alkylating agents are allowed to react with the vinyl aromatic polymer particles after they are swollen by an organic swelling medium. At least a portion of the organic swelling medium may optionally be removed. The particles may optionally be swollen with at least one additional monomer, which may then be polymerized.

15 Claims, No Drawings

IMBIBER POLYMERS ALKYLATED AFTER POLYMERIZATION

Cross-Reference to Related Application

This is a divisional, application Ser. No. 194,645, filed May 16, 1988, now U.S. Pat. No. 4,835,222 which is a continuation of Ser. No. 016,438 filed Feb. 19, 1987, now abandoned.

This invention relates to imbibing polymers and methods for making them.

Imbibing polymers are described herein as "organic fluid-insoluble", organic fluid-swellable" polymers. The term "organic fluid-insoluble, organic fluid-swellable polymer" is used herein to mean those polymers which have the property of being substantially insoluble in, but capable of being swollen by, that is, imbibing, one or more non-aqueous organic fluids such as, for example, gasolines, light oils, heavy oils, aliphatic and aromatic hydrocarbons, aromatic solvents such as benzene, toluene, and the like, terpenes, ketones, aldehydes, fatty acids, their esters and amides, halohydrocarbons, polar organic compounds and the like. Polymers may imbibe fluids in liquid or vapor states.

A number of polymers exhibit organic fluid-insoluble, organic fluid-swellable characteristics; that is, they absorb fluids and swell in doing so, a process referred to herein as imbibing. Polymers of alkylstyrene monomers are especially useful for imbibing because they absorb fluids more rapidly than other polymers that may be used practically. Advantageously, the polymers of alkylstyrene monomers are lightly crosslinked. The term "lightly crosslinked" is used herein to describe polymers crosslinked with from about 0.01 to about 0.2 percent by weight of crosslinking agent based on total weight of polymer.

Preparation of imbibing polymers of alkylstyrene monomers is, however, difficult and expensive. First, preparation of the alkylstyrene monomers, such as t-butyl-styrene and the like, requires a complex multistep preparation involving alkylation, oxidation, hydrogenation and dehydration. Second, polymerization of these alkylstyrene monomers with desired levels of crosslinking requires careful control of polymerization conditions.

In spite of difficulties in their preparation, lightly crosslinked organic fluid-insoluble, organic fluid-swellable polymers of alkylstyrenes have found wide utility in absorbing and controlling fluids from substrates as exemplified in U.S. Pat. No. 3,520,806, the teachings of which are incorporated herein by reference. The term, "substrate", is used herein, as is in U.S. Pat. No. 3,520,806, to refer to the medium or vehicle which contains the organic fluid to be separated. The organic fluid may be in the substrate or on the substrate. Illustrative substrates include solid surfaces like earth, metals, wood and concrete as well as liquids like water or any other liquid material which does not substantially dissolve or swell the polymers. The polymer particles are useful for removing organic vapors from gases. See, U.S. Pat. No. 3,686,827. Removal of organic substances by the polymers is incorporated into disposal systems. See, U.S. Pat. No. 3,881,295. The imbiber polymers are also used to make valves which close when the polymer particles absorb sufficient organic fluid to cause the particles to swell and restrict flow of the fluid. See, U.S. Pat. Nos. 3,750,688; 3,958,590; and 4,024,882. Imbiber polymer particles also provide drift control for packaging, form combustible fuel slurries, and are used for weight control and the like. See, U.S. Pat. Nos. 3,235,366; 3,999,653; 4,416,945; 4,130,400; and 4,329,968.

Polymers, including copolymers, of alkylstyrene monomers are particularly useful for imbibing a wide variety of organic fluids, especially aliphatic and aromatic hydrocarbons. Lightly crosslinked polymers and copolymers of monomers such as alkylstyrenes like n-butylstyrene, sec-butylstyrene, n-amylstyrene, n-hexylstyrene and the like are taught for imbibing. Polymers of tertiary alkyl styrenes such as p-tert-butylstyrene and the like and their copolymers are frequently used. Such polymers usually show substantial swelling and imbibition when in contact with organic liquids for less than about one minute.

Copolymers of alkylstyrene monomers with monomers such as acrylic or methacrylic acid esters of $C_1$ to $C_{24}$ alcohols or mixtures thereof and the like are useful for imbibing. For such copolymers to exhibit buoyancy on water and absorption of a wide variety of organic fluids, a weight percentage of alkylstyrene represented by at least about 100/n, where n is the number of carbons in the alkyl group on the styrene is generally beneficial. Advantageously the weight percentage of alkylstyrene in the copolymer is at least about 200/n. See U.S. Pat. No. 3,686,827. Imbiber polymer particles having polymerized therein alkylstyrene monomers are prepared as described in U.S. Pat. Nos. 4,432,968; 3,520,806; 3,686,827 and 3,750,688, the teachings of which are incorporated herein by reference.

One object of this invention is preparing polymer particles, which act similar to alkylstyrene and alkylstyrene/(meth)acrylic acid ester polymers, from readily available starting materials.

Another object of the invention is preparation of efficient and effective organic liquid-insoluble, organic liquid-swellable (imbiber) polymer particles from readily available vinyl aromatic polymer particles and alkylating agents. In the method of the invention, vinyl aromatic polymer particles are swollen and allowed to react with alkylating agents to form active imbibing polymer particles. Lightly crosslinked vinyl aromatic polymer particles have previously proven resistant to alkylation by bulky molecules, such as t-butyl halides and the like, needed to improve imbibing properties. The present invention overcomes previous difficulties.

In one aspect, this invention is a method of preparing organic fluid-insoluble, organic fluid-swellable polymer particles comprising (a) swelling vinyl aromatic polymer particles in an admixture of organic swelling medium and at least one Friedel Crafts catalyst and (b) exposing the swollen vinyl aromatic polymer particles to at least one alkyl halide under alkylating conditions, thereby preparing alkylated vinyl aromatic polymer particles. The method may optionally include a step (c) wherein at least a portion of the organic swelling medium is removed from the alkylated vinyl aromatic polymer particles. The method may also optionally include a step (d) wherein alkylated vinyl aromatic polymer particles are swollen with at least one monomer selected from the group consisting of esters of unsaturated acids with $C_{10}$ $C_{18}$ alcohols and a step (e) wherein the monomer is polymerized, said step (e) following step (d).

In another aspect, the invention is organic fluid-insoluble, organic fluid-swellable polymer particles prepared by such a process including steps (a) and (b). In yet another aspect the invention is organic fluid-insoluble, organic fluid-swellable polymer particles produced by the process including steps (a), (b), (c), (d) and (e). Another aspect of the invention is the particles so produced having an equilibrium swelling index of at least about 1.5 in toluene at a temperature of about 30° C. under atmospheric pressure. Another aspect of the invention is interpenetrating network polymers comprising a first polymer having alkyl aromatic side chains on an aliphatic hydrocarbon backbone chain, said first polymer having intertwined therewith a second polymer of at least one monomer selected from the group consisting of esters of unsaturated acids with $C_{10}$ to $C_{18}$ alcohols. Yet another aspect of the invention is those interpenetrating polymer networks having an equilibrium swelling index of at least about 1.5 in toluene at a temperature of about 30° C. under atmospheric pressure.

The term "alkylating conditions" as used herein refers to the aggregate of reaction conditions such as temperature, pressure, time, medium, and the like, under which an alkyl halide reacts with an aromatic ring in a vinyl aromatic polymer such that the alkyl group from the halide is bonded to the ring. The reaction of an alkyl halide and aromatic ring is referred to herein as alkylation. Temperatures, pressures, times, media, and the like as well as their interdependence are described with specificity herein.

Vinyl aromatic polymer used for the present invention are polymers and copolymers of monomers selected from the group consisting of styrene, halostyrenes, such as chlorostyrene, dichlorostyrene, bromostyrene, fluorostyrene and the like; and partially alkylated styrenes such as alpha-methylstyrene, vinyltoluene and the like. Partially alkylated styrenes useful in the invention are generally those having about one or two alkyl groups comprising from about one to about three carbon atoms. Alkylated styrene monomers having more than one or two alkyl groups of one to three carbons are generally present in minor amounts, of less than about ten percent by weight in polymers useful in the invention. Styrene itself is a preferred monomer primarily because of its availability and low cost. Other vinyl aromatic monomers are also useful, particularly when copolymerized with styrene. The polymer particles may comprise monomers copolymerizable with vinyl aromatic monomers so long as they do not interfere with alkylating the vinyl aromatic polymer to the degree needed for imbibing organic fluids of interest. Beneficially, the vinyl aromatic polymer particles consist essentially of polystyrene.

To imbibe, the polymers prepared by the method of the present invention must swell when in contact with organic liquids, but not dissolve therein. The utility of an imbibing polymer for absorbing a particular organic liquid is indicated by its swelling index. The term "swelling index" refers to a ratio of volume per unit weight of a polymer swollen with organic fluid to its original volume per unit weight before contact with the organic fluid. An "equilibrium swelling index" can be readily determined by immersing a particular polymer to be evaluated in an organic liquid until equilibrium between absorption and release of liquid is established and one observes no further swelling. The volume per unit weight of the polymer at equilibrium is determined and compared with the polymer's original volume per unit weight. A period of 30 minutes in the liquid is frequently sufficient for efficient imbibing polymers to reach equilibrium. Similarly, a "kinetic swelling" index can be readily determined by immersing a particular polymer to be evaluated in an organic liquid and determining the ratio of the volume per weight of the polymer swollen with organic liquid to the original volume per unit weight of the polymer alone at given intervals less than the period necessary to reach a equilibrium swelling. Volume change per time interval can be charted. Swelling kinetics can also be illustrated by comparing the times required by polymer particles having various characteristics to reach equilibrium swell in specified liquids to be imbibed. "Equilibrium swell", as used herein, is that condition wherein polymer particles imbibe a maximum amount of a liquid under given conditions of temperatures and pressure and achieve an equilibrium between the amount of liquid absorbed and released while the conditions remain constant. Under conditions of equilibrium swell, no additional swelling of the polymer is observed. Unless otherwise stated, room temperature and atmospheric pressure are generally used for determinations of swelling index and eqilibrium swell. Unless otherwise stated, the term "swelling index" is used for equilibrium swelling index.

If the equilibrium swelling index of polymer particles in a given fluid is greater than about 1.2, the polymer particles are useful for imbibing the fluid. Beneficially, for most applications of particles prepared by the method of the invention, a swelling index of at least about 1.5 is useful and a swelling index greater than about 3 is desirable. Crosslinking limits both the solubility and swelling of polymer particles. For most applications, it is desirable to employ a polymer which is crosslinked to a sufficient degree that it exhibits an equilibrium swelling index between about 3 and about 50. Advantageously, the swelling index will be from about 5 to about 50. Generally, polymers are most useful as imbibing polymers if they show significant swelling, that is, at least about 25 percent increase in volume in a period of about 10 minutes in the organic liquid which the polymers are required to imbibe under service conditions and temperature.

Polymers used as imbibing agents are generally crosslinked by a slight amount of crosslinking agent, preferably in the range of about 0.01 to about 2 percent by weight, based on total weight of polymer. From about 0.01 to about 1 percent crosslinking agent by weight is often effective for imbibition. Polymer particles, crosslinked with from about 0.01 to about 0.2 percent by weight crosslinking agent, referred to herein as lightly crosslinked, are beneficial for use in the instant invention. Vinyl aromatic polymer particles formed with from about 0.05 to about 0.1 percent by weight crosslinking agent are advantageous.

Imbibing polymer particles should be crosslinked to an extent sufficient to prevent dissolving in the fluid being imbibed but not enough to inhibit swelling necessary for imbibing. If there is too much crosslinking, swelling and imbibition are slow, and the amount of liquid the polymer can imbibe is limited. Too much crosslinking of the polymer particles to be alkylated in the process of the invention inhibits swelling the organic swelling medium of this invention and thereby inhibits alkylation. A polymer with too little crosslinking may dissolve in the organic swelling medium or the liquid to be imbibed or may form a mass of polymer-thickened organic liquid. In applications wherein the imbibing polymer particles are confined in use, additional crosslinking sufficient to prevent particle swelling that might break in a container or block flow through a column, for instance, may be necessary.

Crosslinking agents which can be used in preparing the imbibing polymers of the present invention include compounds with two or more sites of ethylenic unsaturation. Such compounds include divinylbenzene, diethylene glycol dimethacrylate, diisopropenyldiphenyl, diallyl maleate, diallyl phthalate, allyl acrylates, allyl methacrylates, allyl fumarates, allyl itaconates, alkyl type resins, butadiene or isoprene polymers, cyclooctadienes, methylene norbornylenes, divinylphthalates, vinyl isopropenylbenzene, divinyl diphenyl, and the like. Other di- or polyfunctional compounds known to be of use as a crosslinking agent in polymeric vinyl-addition compositions are similarly useful. Divinylbenzene is a particularly suitable crosslinking agent.

Vinyl aromatic polymer particles suitable for purposes of the present invention may be prepared by any inconvenient technique, either suspension, emulsion or mass polymerization known in the art. Generally, the method of preparation is selected to provide the polymer in a form most convenient for a particular application. Thus, if it is desired to have free flowing, readily packed beads or particles, suspension polymerization is generally employed. If it is desired to obtain beads or particles having the maximum amount of polymer surface and a relatively high imbibition rate, it is oftentimes desirable to use an emulsion polymerization technique and to recover the polymer by spray drying. If it is desired to obtain a body or particles of predetermined configuration, it is oftentimes beneficial to use a mass polymerization technique with a polymer-insoluble diluent. Techniques for mass preparation of such polymers are disclosed in U.S Pat. No. 3,322,695, the teachings of which are incorporated herein by reference. Alternatively, satisfactory particles are prepared by mass polymerization with subsequent comminution of the polymer prepared by the mass technique.

Vinyl aromatic polymer particles made by these processes are generally non-macroreticular, that is microreticular rather than macroreticular. Microreticular particles swell as organic media fills and enlarges their pores. By way of contrast, macroreticular particles have relatively large pores, generally several hundred angstroms in diameter, and absorb organic liquids into existing open pores rather than swelling with absorption of organic liquids. Swelling is measured by the swelling index described above.

Microreticular particles are more difficult to alkylate than are the highly porous macroreticular particles, which more readily admit bulky alkylating agents. However, once they are alkylated, microreticular particles yield the desired organic fluid-insoluble, fluid-swellable polymer particles. Alkylated macroreticular polymer particles, on the other hand, remain macroreticular and are not swellable to an extent needed for imbibing. Macroreticular particles also generally have greater crosslinking than would be useful in an imbiber particle.

The particle size of polymers useful in the invention is selected in accordance with the desired rate of imbibition. Larger particles are employed for slower imbibition; smaller particles, for rapid imbibition. For most applications, a particle size from about 0.1 to about 5 millimeters in diameter is suitable. For rapid imbibition, it is usually beneficial to employ particles having diameters of about 500 microns or less. Desirably, lightly crosslinked vinyl aromatic polymer particles with average diameters in the range of about 200 to about 350 microns will be used in the method of the invention.

Alkylation generally increases average particle diameter somewhat. Alkylating particles in the range of about 200 to about 350 microns will beneficially produce particles of about 250 to about 500 microns in diameter.

Although the preceding discussion of polymer particle size assumes a generally spherical, albeit irregular, particle shape, polymer particles, useful in the invention, may be formed in desired shapes. For instance, they may be shaped in the manner of U.S. Pat. No. 3,322,695. The particles may be in the shape of fibers or tubes, for instance. The size of shaped particles, just as the size of generally spherical polymer particles effects their rate of imbibition.

To optimize each application, factors such as temperature, configuration, quantity of fluid, the presence of water and the like must be considered. Slow absorption observed at low temperatures may, for instance, necessitate use of smaller particles than would be used at room temperature. Increased ability of some organic fluids to dissolve polymers at high temperatures can indicate desirability of more highly crosslinked particles. Configurations in uses that involve confining particles, such as in a container, indicate use of particles crosslinked sufficiently to inhibit swelling thereof to a degree that would damage the container. When particles are used in a porous container, for instance, they should be large enough to stay inside the container. Particles used without a container, for instance spread on a substrate, are generally more easily retrieved after imbibition if they are large. Still, they must be small enough to imbibe a given fluid within a time suitable for the application. In absorption of very small quantities of fluid, smaller particles within the indicated ranges have the advantage of greater surface to volume ratio and are often useful for better contact with the fluid. If the polymer body has water therein, imbibition is usually somewhat slower than when the water is absent. Similarly, water in the fluid to be imbibed, or water as a substrate may slow imbibition.

Vinyl aromatic polymer particles prepared by any processes referred to herein are alkylated using at least one alkyl halide. As used herein, "alkyl" means a saturated, aliphatic, monovalent hydrocarbon group that may be straight chained or branched and contains from about 4 to about 20 carbon atoms, and "halide" refers to fluoride, chloride, bromide or iodide. Desirably a secondary or tertiary alkyl halide is used. Beneficially, the alkyl halides are monohalides or mixtures thereof with limited amounts of di- or polyhalides. The amounts of di- or polyhalides are less than those which would result in crosslinking in excess of that preferred for imbibition in a desired application. Useful alkyl halides include secondary alkyl halides such as sec-butyl chloride, sec-hexyl chloride, sec-octyl chloride, sec-eicosyl chloride, sec-dodecyl chloride, isobutyl chloride, isoamyl chloride, isohexyl chloride, isooctyl chloride, isododecyl chloride, isoeicosyl chloride, sec-butyl bromide, sec-hexyl bromide, sec-octyl bromide, sec-eicosyl bromide, sec-dodecyl bromide, isobutyl bromide, isoamyl bromide, isohexyl bromide, isooctyl bromide, isododecyl bromide, isoeicosyl bromide, and the like. Tertiary alkyl halides such as tert-butyl-chloride, tert-amyl chloride, tert-hexyl chloride, tert-octyl chloride, tert-dodecyl chloride, tert-octadecyl chloride, tert-eicosyl chloride, as tert-butyl bromide, tert-amyl bromide, tert-hexyl bromide, tert-octyl bromide, tert-dodecyl bromide, tert-octadecyl bromide, tert-eicosyl bromide, and the like or mixtures thereof are preferable. Beneficially, the alkyl halide is an alkyl chloride. Tertiary butyl chloride is the preferred alkylating agent for alkylating vinyl aromatic polymer particles to form the imbibing polymers of the present invention.

Alkylation takes place in an organic medium in which the vinyl aromatic polymer particles swell sufficiently to allow a desired degree of alkylation to occur. Such an organic medium is referred to herein as an organic swelling medium. The organic swelling medium must be capable of dissolving or complexing a sufficient quantity of at least one Friedel Crafts catalyst, or a complex thereof with the desired alkylating agent, to achieve the degree of alkylation needed for a particular application of the imbiber particles. The organic swelling medium must not itself be an alkylating agent that would, under the process conditions, crosslink the vinyl aromatic polymer particles either to an extent that would make the particles ineffective or inefficient as imbiber particles or to an extent that would prevent the needed degree of alkylation by the desired alkylating agent. Beneficially the organic swelling medium is selected from the group consisting of aromatic nitro compounds such as nitrobenzene, nitrotoluene, dinitrobenzene and the like; halogenated aromatic hydrocarbons such as chlorobenzene, fluorbenzene, bromobenzene and the like; and mixtures thereof. The organic swelling medium desirably comprises nitrobenzene, chlorobenzene or a mixture of nitrobenzene and chlorobenzene. Optionally, the nitrobenzene and/or chlorobenzene may be mixed with other organic liquids capable of swelling vinyl aromatic polymer particles so long as the other liquids do not substantially crosslink the particles or otherwise interfere with the alkylation. Advantageously, there is at least about 50 percent by weight nitrobenzene in the organic swelling medium. The organic swelling medium beneficially consists essentially of nitrobenzene or chlorobenzene or mixtures thereof. More alkylation is generally observed in nitrobenzene than in chlorobenzene.

The organic swelling medium is used in a ratio of about 1 part by weight vinyl aromatic polymer particles to at least about 1 part by weight organic swelling medium. Beneficially, the ratio is about 1 part by weight vinyl aromatic polymer particles to at least about 3 parts by weight organic swelling medium. The preferred ratio is 1 part of vinyl aromatic polymer paticles to at least about 6 parts of organic swelling medium by weight. More than about 10 parts by weight of organic swelling medium to vinyl aromatic polymer particles is generally more than is needed for effective alkylation.

The organic swelling medium has admixed therewith a Friedel Crafts catalyst such as aluminum chloride, ferric chloride, zinc chloride, aluminum bromide and the like. Aluminum chloride is the preferred catalyst. With aluminum chloride as the catalyst, one can achieve an average of about one alkyl group per aromatic ring in a polymer. Alkylation using other catalysts generally results in an average of less than one alkyl group per aromatic ring.

The Friedel Crafts catalyst is present in a ratio of about 0.02 to about 0.75 parts by weight to one part by weight of the vinyl aromatic polymer particles. About 0.02 to about 0.35 parts by weight of catalyst to one part by weight of vinyl aromatic polymer particles is beneficial. The preferred ratio is about 0.1 to 0.15 parts by weight of catalyst to about 1 part by weight of vinyl aromatic polymer.

Generally, an admixture of the organic swelling medium and catalyst is used to swell the vinyl aromatic polymer particles before the alkylating agent is added to the reaction mixture. Alternatively, a portion of the organic swelling medium not containing catalyst, or another liquid capable of swelling the polymer particles without interfering with the alkylation process, may be used to swell or partially swell the polymer particles before the organic swelling medium containing the catalyst is added. The alkylating agent may alternatively be added to the organic swelling medium before the polymer particles are mixed with the medium.

Alkylated vinyl aromatic polymer particles having one alkyl group bonded to each aromatic ring in the polymer most closely resemble imbibing polymers made from alkylstyrene monomers. The amount (in moles) of alkylating agent used to react with the vinyl aromatic polymer particle, is, therefore, measured relative to the number (moles) of vinyl aromatic monomer used to form the polymer particles. The number of vinyl aromatic monomer units corresponds to the number of aromatic rings to be alkylated. A molar excess of the alkylating agent is generally beneficial. Advantageously, one uses at least about 1.05 moles of alkylating agent to each mole of vinyl aromatic monomer in the vinyl aromatic polymer particles. In some instances, especially when there are side reactions, about 2 moles of alkylating agent for each mole of vinyl aromatic monomer is beneficial. Generally, an advantageous mole ratio of alkylating agent to vinyl aromatic monomer is about 1.1 to 1.25.

The temperatures and times necessary for the alkylation process of the invention vary with the reaction, the organic swelling medium, the desired degree of alkylation, and the like. Beneficially, the process may be performed at about 20° C. About 20 to 50 mole percent of polystyrene with t-butyl chloride is observed in about 18 hours. The same reaction in nitrobenzene requires less than an hour for about 99 mole percent alkylation. Under the same conditions, no reaction was observed in orthodichlorobenzene, 1,2,4-trichlorobenzene or tetrahydrofuran. Higher temperatures may be used as may longer or shorter times.

Generally, time, organic swelling medium and temperatures are optimized to achieve the desired alkylation with minimal decomposition of polystyrene. Polystyrene decomposes or depolymerizes with long or high temperature exposure to Friedel Crafts catalysts. Similarly, some conditions can result in elimination of hydrogen halide, e.g. hydrochloric acid, from the alkylating agent in competition with alkylation. This elimination is favored by higher temperatures, a strong Lewis Acid environment, and mildly complexing solvents such as tetrachloroethylene, carbon disulfide and tertiary butyl chloride and the like as an organic swelling medium. Conditions favoring these and other side reactions are desirably minimized, if not avoided.

Removal of at least a portion of the organic swelling medium from the alkylated vinyl aromatic polymer particles is beneficial. The size of the portion removed depends on difficulty of removal, effects of remaining swelling medium, intended application for the particles and, in some instances, environmental regulations. Generally, the organic swelling medium can be thought of as occupying capacity that would otherwise be used to imbibe another fluid. Desirably, therefore, substantially all of the swelling medium is removed for maximum capacity. Difficulty in removal may make removal of only a portion of the organic swelling medium, with sacrifice of corresponding capacity for other fluids, advisable. In some applications, improved kinetics of imbibition from a plasticizing effect of remaining swelling medium will be worth the sacrifice of capacity. Environmental effects of some swelling media in sensitive applications may dictate as complete a removal as possible.

In some applications removal of substantially all of the swelling medium is not needed, even for a high imbibing capacity. Removal of the organic swelling medium is not necessary for imbibition when the organic fluid to be imbibed will displace the swelling medium. Generally, however, the organic swelling medium is removed from the alkylated vinyl aromatic beads at least to an extent commensurate with the extent to which they are to imbibe other organic fluids. Without undue experimentation, one skilled in the art can determine the relative balance among harmful effects of residual swelling medium, capacity for imbibing an organic fluid, displacement effects and costs or difficulties in removing swelling medium.

Removal of at least a portion of the organic swelling medium may be accomplished by any of several methods which may be used individually or sequentially. A portion of the medium may be decanted or filtered from the particles. The swollen particles may be added to a large excess (at least about a two to three volume excess) of methanol or other solvent which will cause the polymer particles to shrink and become hard. Other lower alkanols including ethanol and propanol, and other solvents such as acetone, methylene chloride, water and the like are among solvents which cause this shrinking. One or more washings with methanol or another solvent which causes shrinking may be used. The solvent chosen to remove the organic swelling medium, the quantity of solvent required, and the number of washings with the solvent depend on the organic swelling medium, quantity of it used and the degree of removal necessary for the intended use of the imber particles.

Steam stripping may also be used to reduce the level or organic swelling medium in the polymer particles. For steam stripping, the polymer particles are exposed to a flow of steam which, with the solvents it may carry, subsequently may be condensed and recovered. The amount of steam and length of exposure time to it are determined, again, by the amount and kind of swelling medium to be removed. The steam stripping may be used alone or with, preferably subsequent to, washing with a solvent that causes shrinking. Illustrative times and conditions for removal are shown in the examples of the invention herein. These removal methods are illustrative of those which may be used; the method of the invention is not limited to them.

For some uses, it is desirable to form an interpenetrating network within the vinyl aromatic polymer particles, after alkylation by the method of the invention. Interpenetrating networks are formed by (a) swelling the vinyl aromatic polymer particles with at least one monomer and (b) polymerizing the monomer(s). Resulting interpenetrating networks have a structure comprising a vinyl aromatic polymer having intertwined or interlaced therein polymers of the monomer(s) with which the vinyl aromatic polymer particles are swollen. Such interpenetrating networks differ structurally from copolymers of vinyl aromatic or alkylated vinyl (aromatic) monomers with the monomers used to form the interpenetrating network. The interpenetrating networks do, however, form organic fluid-insoluble, organic fluid-swellable particles with imbibing characteristics similar to those of copolymers of corresponding monomers.

Interpenetrating networks are formed either from vinyl aromatic polymer particles alkylated by the method of the invention or from alkylstyrene polymer particles. The alkylstyrene polymer particles are produced by known methods including those incorporated herein by reference. The polymer particles, of either type, are swollen with at least one monomer, which monomer is subsequently polymerized to form an interpenetrating polymer network.

The network comprises a first polymer having alkyl aromatic side chains on a backbone consisting essentially of an aliphatic hydrocarbon chain, said polymer having intertwined therein a second polymer of at least one monomer. The side chains are beneficially secondary or tertiary alkyl aromatic side chains. Interpenetrating polymer networks of the invention desirably have tertiary alkyl aromatic side chains. Tertiary butyl aromatic side chains are advantageous and tertiary butyl benzene side chains are preferable. Bulky side chains like those found beneficial, advantageous, desirable and preferable generally result in better imbibing characteristics in interpenetrating network polymers than are observed with smaller side chains like methyl or ethyl benzene.

The term "backbone", as used herein, denotes that part of a polymer molecule formed by joining repeating units of the polymer. The backbone runs the length of the polymer and may be generally linear or branched. The term "side chains", as used herein, refers to those portions of a polymer molecule which are attached to, but do not form part of, the backbone. In the case of a polymer of a vinyl aromatic monomer, the backbone is a chain of repeating ($-CH_2-CH_2-$) units formed from the vinyl groups as they join in the process of polymerization. Side chains of that polymer, than, are the aromatic groups which are attached to the backbone.

Unsaturated monomers such as at least one ester selected from the group consisting of esters of unsaturated acids such as acrylic acid, methacrylic acid, itaconic acid, fumaric acid, crotonic acid, aconitic acid, maleic acid and the like and mixtures thereof are suitable for use in forming interpenetrating network polymers. Unsaturated acid esters formed from unsaturated acids and the $C_1$ to $C_{18}$ alcohols are suitable for use in the invention. Suitable monomers include methyl acrylate, ethyl acrylate, propyl acrylate, butyl acrylate, isopropyl acrylate, allyl acrylate, sec-butyl acrylate, tert-butyl acrylate, n-amyl acrylate, isoamyl acrylate, tert-amyl acrylate, hexyl acrylate, octyl acrylate, decyl acrylate, capryl acrylate, n-decyl acrylate, lauryl acrylate, myristyl acrylate, cetyl acrylate, stearyl acrylate, methyl methacrylate, ethyl methacrylate, propyl methacrylate, butyl methacrylate, isopropyl methacrylate, allyl methacrylate, sec-butyl methacrylate, tert-butyl methacrylate, n-amyl methacrylate, isoamyl methacrylate, tert-amyl methacrylate, hexyl methacrylate, octyl methacrylate, decyl methacrylate, capryl methacrylate, n-decyl methacrylate, lauryl methacrylate, myristyl methacrylate, cetyl methacrylate, stearyl methacrylate, and the like. Acrylate and methacrylate esters of the $C_{10}$ to $C_{18}$ alcohols are advantageous, with methacrylates of the $C_{10}$ to $C_{18}$ alcohols preferred. The acrylates and methacrylates may be mixed with one another and with esters of other unsaturated acids. Minor amounts of esters or partial esters of unsaturated polycarboxylic acids mixed with esters of acrylic or methacrylic acid produce useful polymers.

Beneficially, the monomer is selected from the group consisting of capryl acrylate, n-decyl acrylate, lauryl acrylate, myristyl acrylate, cetyl acrylate, stearyl acrylate, capryl methacrylate, n-decyl methacrylate, lauryl methacrylate, myristyl methacrylate, cetyl methacrylate, stearyl methacrylate, and mixtures thereof. Desirably, the monomer is selected from the group consisting of capryl methacrylate, n-decyl methacrylate, lauryl methacrylate, myristyl methacrylate, cetyl methacrylate, stearyl methacrylate, and mixtures thereof. Lauryl methacrylate is advantageous for formation of an interpenetrating network polymer.

Beneficially, the interpenetrating network comprises at least about 50 weight percent alkylated vinyl aromatic polymer. Desirably, the interpenetrating network polymer comprises from about 10 to about 50 weight percent of unsaturated ester polymer. Advantageously, the interpenetrating network polymer comprises from about 15 to about 40 weight percent unsaturated ester polymer.

For information of an interpenetrating network polymer, the alkylated vinyl aromatic polymer particles are suspended in a medium such as water and swollen with at least one suitable monomer used to form the network. Addition of monomer to suspended polymer particles is generally convenient. Optionally, polymer particles suspended in water could be added to the monomer, preferably with agitation. The monomer is then polymerized in the presence of the alkylated particles. Desirably, the polymer particles have at least a portion of the organic swelling medium used for alkylation removed from them before the monomer or mixture of monomers is added thereto. Removal of a portion of the swelling medium facilitates swelling by monomer. The swelling medium is removed at least to the extent necessary to admit a desired amount of monomer. Desirably, substantially all of the swelling medium is removed from the alkylated polymer particles. One skilled in the art can readily, without undue experimentation, balance need for removal with the difficulty of removal to achieve useful degrees of swelling medium removal.

Advantageously, stirring or agitation is maintained during the addition of monomer to the alkylated polymer particles and during polymerization of the monomer. Beneficially, compounds such as surfactants or protective colloids, such as carboxymethyl methylcellulose, are used to aid in maintaining a slurry. Free radical producing initiators known in the art for such addition polymerization are conveniently used in polymerizing the unsaturated ester monomers. Suitable initiators include sodium dichromate and peroxygen compounds such as inorganic persulfates e.g., ammonium persulfate, potassium persulfate, sodium persulfate and the like. Peroxides such as hydrogen peroxide and organic peroxy compounds such as benzoyl peroxide, acetyl peroxide, lauryl peroxide, peracetic acid, perbenzoic acid, t-butyl peroctoate and the like are suitable. Azo compounds such as 2,2'-azobisisobutyronitrile and the like are also suitable. Other compounds or materials known in the art for use in such addition polymerizations may optionally be present. One skilled in the art can readily determine times, temperatures and other reaction conditions suitable for polymerization of a particular monomer without undue experimentation.

The following examples are presented to further illustrate but not to limit the scope of this invention. In each example the particle size is given in mean volume average diameter as measured according to ASTM D-2187-72 and designated herein $L_{50}$.

EXAMPLE 1

Preparation of t-Butylated Polystyrene Beads

A solution of 1.5 grams (g) of aluminum trichloride was made in 50 millimeters (ml) of nitrobenzene in a 100 ml round bottomed flask protected from moisture by a drying tube containing calcium sulfate. To that solution was added 20 ml (0.18 moles) of t-butyl chloride then 10 g (0.10 moles of polystyrene beads (average diameter ($L_{50}$) 260 microns ($\mu$)) which had been crosslinked with 0.1 percent by weight of divinylbenzene. After 18 hours at about 25° C., the beads were suction filtered and washed three times with 100 ml of 5 percent by volume methanol in methylene chloride. Then they were washed with 100 ml of methanol and dried in a vacuum oven at 70° C. for 2 hours. The beads were shrunken and contained two to three weight percent nitrobenzene.

The beads were then steam distilled in a 7 inch by 1 inch diameter glass column containing a glass frit and topped with glass wool. Steam was generated in a 1 liter stainless steel 3-necked round bottomed flask heated with a mantle, and fitted with a pressure equalizing funnel for water delivery. Heating tape and glass wool were wrapped around the column containing the beads. Take-off steam from the top of the column was passed through a water condenser. Steam distillation was stopped when gas chromatographic analysis indicated that nitrobenzene concentration in recovered condensate had fallen to about 10 to 20 parts per million (ppm).

The resulting t-butylated polystyrene beads had a bulk density of about 0.4 g/ml and a swelling index in toluene of about 13 ml/g.

EXAMPLE 2

Preparation of an Interpenetrating Network Polymer of Lauryl Methacrylate in t-Butylated Polystyrene Beads One hundred grams of beads of t-butylated polystyrene were placed in a 1 liter 3-neck round bottomed flask equipped with stirrer, condenser and addition funnel. First, 200 ml of deionized water, then 30 g of lauryl methacrylate containing 0.10 percent by weight of t-butyl peroctoate were added with stirring over about a 1 minute period. Stirring was continued about 30 minutes. Then 200 ml of 0.4 percent by weight of carboxymethyl methylcellulose in water were added with 0.40 g sodium dichromate. The temperature was raised to 70° C. and allowed to remain there for about 1 hour. Then the temperature was raised to 95° C. After 2 hours at 95° C., the reaction mixture was cooled. The beads were then filtered, washed with a 2 to 3 volume excess of deionized water and air dried at about 25° C.

The resulting interpenetrating network polymer had a bulk density of about 0.48 g/ml.

EXAMPLE 3

Preparation of t-Butylated Polystyrene Beads

Fifty-nine grams of anhydrous aluminum trichloride was dissolved in 2.27 liters of nitrobenzene in a 6 liter, 3-necked glass reactor equipped with an air stirrer and addition funnel. To this medium, was added 454 g of polystyrene beads crosslinked with 0.5 percent by weight of divinylbenzene (bulk density about 0.66 g/ml and average diameter ($L_{50}$) 260–300μ). The polymer beads were allowed to swell for a period of about 15 minutes. Then 640 ml of t-butyl chloride was added over a period of 30 minutes. Initially the swollen beads formed a thick and sticky mass. Stirring was begun at the top of the reaction vessel and continued downward. As the reaction progressed, the bead slurry became more fluid and the entire mass could be stirred. The reaction was allowed to proceed for 2 hours to produce a slurry of alkylated polystyrene beads in the swelling and reaction medium.

Approximately half of the bead slurry was suctioned off through a dip tube into a stirred 5-liter round bottomed flask containing 2 liters of methanol. The methanol was removed and replaced with a fresh 2 liters of methanol. The remainder of the bead slurry was suctioned into the 5 liter flask. A solution of 200 ml of 50 weight percent methanol and 50 weight percent methylene chloride was used to help wash the remaining beads from the reaction flask into the washing flask. The methanol and methylene chloride were removed and replaced with fresh methanol. The slurry was stirred overnight. Then the methanol was again removed and replaced with 2 liters of fresh methanol. Stirring was resumed and continued an hour. The beads then were filtered and washed with dionized water.

Volatile materials were stripped from the beads in a steam distillation apparatus using a flow rate of 1.8 liters per hour of deionized water in the form of steam. After about 5 hours of steam stripping, the beads were dried in air.

The dried beads had a bulk density of 0.32 g/ml. Their swelling index in toluene was 32; in hexane, 24 and in mineral oil based transformer oil, 22. (The swelling indexes for the starting material beads were 34, 0, and 0 respectively, in those liquids.) In the transformer oil with viscosity of 16 cp (centipoise), the t-butylated beads required about 20 hours to reach maximum swell.

Infrared analysis of the t-butylated beads in potassium bromide showed about 98 percent t-butylation as established by peaks at about 3.4, 7.15, and 12 micrometers. Gas chromatography headspace analysis for nitrobenzene showed 12 ppm residual nitrobenzene. Neutron activation analysis indicated 68 ppm aluminum in the washed and steam stripped beads.

EXAMPLE 4

Preparation of an Interpenetrating Network of Lauryl Methacrylate and t-Butylated Polystyrene Beads About 430 g of the t-butylated polystyrene beads of Example 3 were suspended in 1 liter of water in a 3-liter steel reactor. Over a period of 15 minutes, 129 g of lauryl methacrylate were added to the suspension with stirring. To maintain a slurry, the swollen beads were removed from the reactor to a 4-liter beaker containing 10.8 g of carboxymethyl methylcellulose in 700 ml of water and stirred with a high speed mixer.

Sodium dichromate (2.7 g) was added to the stirred slurry. Agitation was maintained at 200 rpm during a polymerization period of 17 hours at 70° C. and 2 hours at 110° C. The beads were filtered, washed with deionized water and air dried at about 25° C. Microscopic examination of the final product showed aggregates of 5 to 25 beads.

The resulting beads had a bulk density of about 0.37 g/ml. Their swelling index in toluene was about 32; in hexane, 24; and in mineral oil based transformer oil, 25. By way of comparison, imbiber beads prepared from t-butyl styrene (70 percent by weight), divinylbenzene (0.05 percent by weight) and lauryl methacrylate (about 30 percent by weight) by copolymerization described in U.S. Pat. Nos. 3,686,827; 3,750,688; and 4,432,968 which have been incorporated herein by reference, having swelling indexes of about 33, 26 and 21 respectively in those solvents. Both types of beads required about 12 hours to reach maximum swell in transformer oil of 16cp.

The t-butylated polystyrene beads prepared by the process of the invention and the beads copolymerized with lauryl methacrylate according to the present invention can be seen to have equilibrium swelling which is comparable to the imbiber beads prepared by known multi-step complex and difficult processes involving preparation and subsequent polymerization of t-butyl styrene and polymerization thereof.

The data demonstrate that both the alkylated vinyl aromatic polymers of the invention and the products of copolymerizing those alkylated polymers with unsaturated ester monomers are organic fluid-insoluble, organic fluid-swellable (imbibing) polymer particles having effectiveness comparable to imbiber polymer particles of the prior art. The imbibing polymers of the present invention, however, are produced from starting materials which are easier to obtain than the alkylated styrene monomers required by the prior art processes.

The organic fluid-insoluble, organic fluid-swellable polymer particles of the invention are illustrated by the above Examples 1 through 4. The invention is not, however, limited to the ingredients or proportions illustrated by the examples. Similar results are expected with other materials and conditions described herein.

What is claimed is:

1. A method of preparing organic fluid-insoluble, organic fluid-swellable polymer particles comprising (a) swelling lightly crosslinked vinyl aromatic polymer particles in an admixture of organic swelling medium and at least one Friedel Crafts catalyst; (b) exposing the swollen vinyl aromatic polymer particles to at least one alkyl halide under alkylating conditions, thereby preparing alkylated vinyl aromatic polymer particles which are organic fluid-insoluble and organic fluid-swellable; (c) removing at least a portion of the organic swelling medium from the alkylated vinyl aromatic polymer particles; (d) swelling the alkylated vinyl aromatic polymer particles with at least one monomer selected from the group consisting of the esters of unsaturated acids with $C_{10}$ to $C_{18}$ alcohols; and a step (e) polymerizing the monomer, said step (e) following step (d).

2. The method of claim 1 wherein the monomer is selected from the group consisting of esters of acrylic or methacrylic acids with $C_{10}$ to $C_{18}$ alcohols and mixtures thereof.

3. The method of claim 1, wherein the monomer is selected from the group consisting of capryl acrylate, n-decyl acrylate, lauryl acrylate, myristyl acrylate, cetyl acrylate, stearyl acrylate, capryl methacrylate, n-decyl methacrylate, lauryl methacrylate, myristyl methacrylate, and mixtures thereof.

4. The method of claim 1, wherein the monomer is selected from the group consisting of capryl methacrylate, n-decyl methacrylate, lauryl methacrylate, myristyl methacrylate, cetyl methacrylate, stearyl methacrylate and mixtures thereof.

5. The method of claim 1, wherein the monomer is lauryl methacrylate.

6. An interpenetrating network polymer comprising a first polymer having alkyl aromatic side chains on an aliphatic hydrocarbon backbone chain, said first polymer having intertwined therewith a second polymer of at least one monomer selected from the group consisting of the esters of unsaturated acids with $C_{10}$ to $C_{18}$ alcohols.

7. The interpenetrating network polymer of claim 6 wherein the alkyl aromatic side chains are secondary or tertiary alkyl aromatic side chains.

8. The interpenetrating network polymer of claim 6 wherein the alkyl aromatic side chains are tertiary alkyl aromatic side chains.

9. The interpenetrating network polymer of claim 6 wherein the alkyl aromatic side chains are tertiary butyl aromatic side chains.

10. The interpenetrating network polymer of claim 6 wherein the alkyl aromatic side chains are tertiary butyl benzene side chains.

11. The interpenetrating network polymer of claim 6 wherein the monomer is selected from the group consisting of esters of acrylic acid or methacrylic acid with $C_{10}$ to $C_{18}$ alcohols or mixtures thereof.

12. The interpenetrating network polymer of claim 6 wherein the monomer is selected from the group consisting of capryl acrylate, n-decyl acrylate, lauryl acrylate, myristyl acrylate, cetyl acrylate, stearyl acrylate, capryl methacrylate, n-decyl methacrylate, lauryl methacrylate, myristyl methacrylate, cetyl methacrylate and stearyl methacrylate and mixtures thereof.

13. The interpenetrating network polymer of claim 6 wherein the monomer is selected from the group consisting of capryl methacrylate, n-decyl methacrylate, lauryl methacrylate, myristyl methacrylate, cetyl methacrylate, stearyl methacrylate and mixtures thereof.

14. The interpenetrating network polymer of claim 6 wherein the monomer is lauryl methacrylate.

15. The interpenetrating network polymer of claim 6 wherein the particles have an equilibrium swelling index of at least about 1.5 in toluene at a temperature of about 30° C. under atmospheric pressure.

* * * * *